Figure 1:
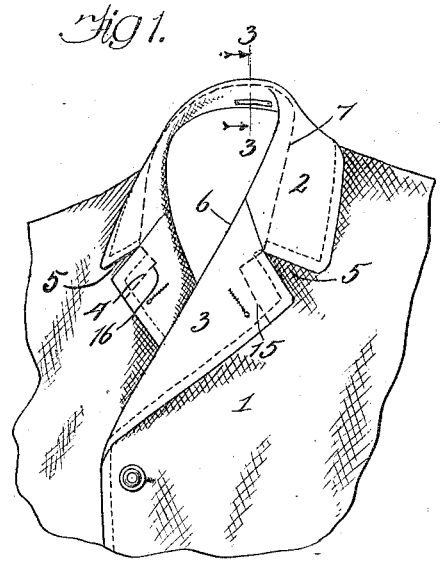

M. H. SCHILLER.
COMBINATION COAT.
APPLICATION FILED JULY 6, 1909.

1,076,707. Patented Oct. 28, 1913.

Witnesses:
Ira D. Perry
A. D. Knight

Inventor:
M. H. Schiller
By Brown & Hopkins
Attys

COLUMBIA PLANOGRAPH CO., WASHINGTON, D. C.

UNITED STATES PATENT OFFICE.

MAURICE H. SCHILLER, OF CHICAGO, ILLINOIS, ASSIGNOR TO STURM, MAYER & COMPANY, OF CHICAGO, ILLINOIS, A FIRM.

COMBINATION-COAT.

1,076,707. Specification of Letters Patent. Patented Oct. 28, 1913.

Application filed July 6, 1909. Serial No. 506,011.

*To all whom it may concern:*

Be it known that I, MAURICE H. SCHILLER, a citizen of the United States, residing at Chicago, in the county of Cook and State of Illinois, have invented certain new and useful Improvements in Combination-Coats, of which the following is a specification.

My invention relates to combination coats and one of its objects is to provide an improved collar which may be transformed at will from a lay-down or normal collar into a military collar, and vice versa, while maintaining an appearance in either position that will be artistic or pleasing to the eye.

A further object of the invention is the provision of a collar for coats which can be transformed from a normal into a military collar and vice versa at will, and when in the military form the lapels will extend to or near the upper edge of the collar so as to fully close the throat portion.

More particularly it is the object of the present invention to provide a collar for coats comprising a stand and leaf portion, the latter having a definitely located incision to form a line of demarcation along which the leaf may be folded on itself to transform the collar from a normal or lay-down collar to a military or stand-up collar.

Also, more particularly the object of the invention is to provide a collar for coats having a line of demarcation or line of fold determined by an incision to enable the collar to be changed from a normal collar into a military collar, and combining with the same, reversible and over-lapping lapels which may be secured in closed position and which extend upwardly a sufficient distance to fully cover and protect the throat of the person wearing the coat.

Heretofore collars for coats have been provided with notches cut in the lapels to direct the line of fold in the leaf, but such notches are not effective in definitely determining the line of fold and besides are irregular and unsightly and cause wrinkling in the collar. Furthermore, when such coats are arranged in military form an opening is left at the throat, to close which an extra strip of cloth must be used. According to the present invention such unsightly features are avoided and the coat is rendered artistic in appearance and can be satisfactorily operated in changing from the normal form to the military form, and vice versa; and there is no necessity for the employment of an extra strip of cloth.

In the embodiment of my invention as shown in the drawings, small triangular notches partially separate the lapels from the leaf portion of the collar, and the collar is so constructed that it may be temporarily creased along a line corresponding in general direction with the upper edges of the lapels from the inner ends thereof. By this means I am able to construct a coat with a reversible collar that is more ornamental in design and more serviceable in use.

Figure 2:
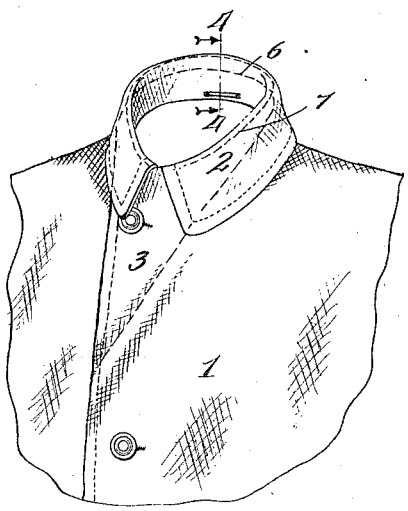
Figure 3:
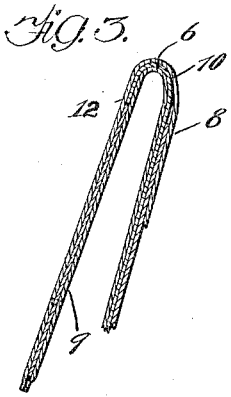
Figure 4:
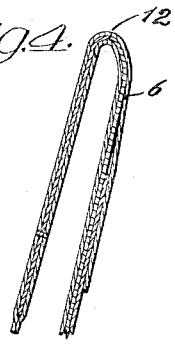

In the accompanying drawings, Figure 1 is a front elevation of a collar embodying my invention showing the same in its normal form; Fig. 2 is a front elevation of the collar showing the same in military or stand-up form and the lapels reversed so as to lie buttoned in over-lapping position with the upper edges of the lapels extending to the upper edge of the collar; Fig. 3 is a section on the line 3, 3 of Fig. 1, looking in the direction of the arrows; Fig. 4 is a sectional view taken on the line 4, 4 of Fig. 2, looking in the direction of the arrows; and Fig. 5 is a plan view of the collar flattened out, with a portion broken away to show the interior construction of the collar of the coat.

Referring more particularly to the drawings showing an embodiment of my invention, 1 designates the main body of the coat which is surmounted by a stand portion, to which is connected along a permanent crease or break line 6 a leaf portion, comprising a collar 2 and the lapels 3 and 4. The lapels are partially separated from the collar 2 by the triangular or V-shaped notches 5, 5. The leaf may be constructed in various ways, but the following is the preferred form. Between the outer exposed layer 8 of cloth as shown in Fig. 3 and the outer lower layer 9 of cloth, is an intermediate layer 10 of canvas or other stiffening material. This intermediate layer is provided with a slit or incision 12 extending lengthwise of the leaf between the inner ends or apexes of the notches 5, 5 in the direction indicated by the dotted line 7 in Figs. 1 and 2, thus forming a line of demarcation. This slit or incision in the leaf in this instance is so arranged with respect to the lapels that it will conform in general direction with the upper edges of the lapels 3 and 4 when the latter are in their over-lapping positions as shown in Fig. 2; that is, when the leaf is folded on itself for the purpose of transforming the collar from a normal collar to a military collar the upper edges of the lapels will be substantially continuous with or in alinement with the slit or incision or line of demarcation so as to entirely close up the throat portion of the coat when the lapels are buttoned or otherwise secured in the position shown in Fig. 2.

Figure 5:
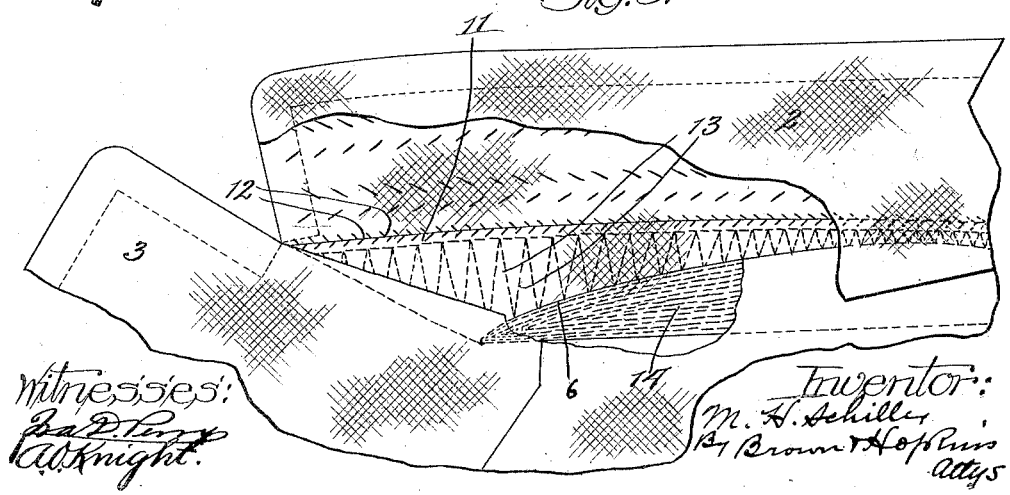

The edges of the canvas or other stiffening material forming the intermediate layer 10 may be left disconnected entirely along the line of the incision or slit 12, but I prefer to hinge the pieces of canvas together along the slit by a feather stitch as shown at 11 in Fig. 5, so as to provide means for adapting the cloth of the coat to lie uncreased over the shoulders as shown in Fig. 1 at 7, or to be creased temporarily along the line of said slit as indicated at 7 in Fig. 2. The canvas 10 between the permanent stand portion 14 or between the break line or permanent crease 6, and the temporary or adjustable crease 7 forming the line of demarcation, may be suitably reinforced preferably with stitches 13 transverse in direction to the longitudinal stitches with which the permanent stand portion 14 of the collar may be provided. The ends of the canvas having the stitches 13 may be variously shaped as desired to secure proper fit and neat appearance when the collar is in normal or military form and the lapels are lying flat as shown in Fig. 1, or overlapped as shown in Fig. 2.

When the coat is to be worn in the normal manner, the collar is arranged as shown in Fig. 1, the uncreased cloth of the collar lying conformably to the shoulders of the wearer and no permanent crease is visible since the slit or incision forming the line of demarcation is on the interior of the leaf. This construction entirely obviates the creased appearance which is unavoidable when a permanent fold is made in the collar along the line indicated at 7. Besides presenting a smooth exterior upper surface over the leaf portion free from creases, the collar is also artistic in that triangular or V-shaped notches are seen instead of irregular and unsightly notches such as those indicated by the dotted lines at 15 and 16. Heretofore, the usual construction of a coat with a reversible collar was such that notches like those indicated at 15 and 16 were seen when the collar was in normal position, which notches were for the purpose of directing a line of demarcation when changing to a military collar, but because of the absence of the interior incision or any other definite line of demarcation such a collar gave unsatisfactory results due to wrinkling and due to the open space of considerable size left at the throat when in military form. To close this space an extra strip of cloth already referred to had to be used and was retained by buttons on the sides of said open space. No extra pieces of cloth are required in carrying out my invention, however, for when the lapels are buttoned in overlapped position the throat portion is entirely covered, the upper edges of the lapels extending to the upper edge of the collar and occupying a position substantially in alinement with the line of demarcation or incision.

When the coat shown in Fig. 1 is to be worn in the form of a military coat, as shown in Fig. 2, the wearer by simply gripping the coat by the collar above the lapels or above the notches 5, 5, on either side, can with little effort fold the leaf on itself to transform the normal collar into the military collar and the lapels can then with ease be overlapped and buttoned in place with their upper edges in line with the ridge of the collar. When the collar has been transformed into the military form, that portion of the leaf between the break line 6 and the line of demarcation 7 will stand in vertical alinement with the permanent stand portion 14 of the collar, and is sustained in its lifted position by means of reinforcement in the form of stiffening material which may include the reinforcing stitches 13 extending between the break line 6 and a seam adjacent the slit 12.

In order to render the coat more modish when used in the military form, the crease 6 may be made permanent only in the interior canvas lining while the soft outer cloth is free to adapt itself without wrinkles or permanent creasing to either the normal or the military positions of the collar.

From the foregoing description it will be seen that a coat constructed according to the principles of my invention will afford a finer appearance normally and a more efficient protection against the weather when used as a military coat. Obviously those skilled in the art may make various changes in the details of construction and arrangement of parts without departing from the spirit and scope of my invention as defined by the claims, and I wish therefore not to be limited to the precise construction disclosed herein.

What I claim is—

1. A coat comprising a collar and lapels with V-shaped notches separating the collar from the lapels, said collar being provided with means forming of itself a temporary predetermined fold line extending from the apex of one notch to the apex of the other notch.

2. A coat having a collar portion formed by permanently creasing the material about the neck portion of the coat, said collar portion being provided with an interlining having a slit therein adapting the collar to be temporarily creased along a line removed from the permanent crease.

3. A coat having one layer of the material of which it is constructed permanently creased to provide a collar and lapel portion, said collar and lapel portion being provided with V-shaped notches to separate the collar from the lapel, and another layer of material provided with a slit extending between the apexes of said V-shaped notches, the edges of said slit being flexibly joined together.

4. In a combination coat, a collar and lapel portion provided with notches separating the collar from the lapels, said collar and lapel portion having an intermediate layer provided with a slit for permitting the collar to be folded along a temporary crease from one notch to the other.

5. In a coat, a portion turned back along a permanent crease, said portion being provided with a slit for permitting the collar to be folded along a temporary crease and having lapels whose upper edges form a continuation of the line of said temporary crease when the collar is creased along said slit.

6. In a coat, a portion turned back along a permanent crease, said portion comprising lapels, a collar separated from said lapels by notches, and means permitting the collar to be folded along a temporary crease between said notches, and in a line conforming in general direction to the top edges of the lapels, said means consisting of an interlining provided with a slit along the line of the temporary crease.

7. In a coat, a portion turned back along a permanent crease, said portion comprising lapels, a collar separated from said lapels by notches, means whereby the collar is folded along a temporary crease between said notches and in a line conforming in general direction to the top edges of the lapels, said means comprising a canvas interlining provided with a slit along the line of the temporary crease and means for stiffening the collar between said permanent and temporary creases.

8. A coat constructed of three layers of material and comprising a body portion and a collar and lapel portion divided therefrom by a crease, said collar being separated from the lapels by V-shaped notches and one of said layers being provided with means whereby the collar may be folded along a predetermined line connecting the apexes of said notches.

9. A coat constructed of a plurality of layers of material and comprising a body portion, a collar and lapel portion adjoining said body portion along the crease, the second said portion being provided with V-shaped notches dividing the collar from the lapels and a slit in one of the layers of the collar extending from the apex of one notch to the apex of the other notch thereby adapting said collar to be temporarily folded along the line of said slit.

10. A coat constructed of three layers of material and comprising a body portion, a collar and lapel portion adjoining said body portion along the crease, the second said portion being provided with V-shaped notches dividing the collar from the lapels and a slit in the intermediate layer of the collar extending from the apex of one notch to the apex of the other notch thereby adapting said collar to be temporarily folded along the line of said slit.

11. A coat constructed of layers of which one is of relatively stiff material, said coat comprising a body portion, a collar and lapel portion adjoining said body portion along a crease, the second said portion being provided with V-shaped notches dividing the collar from the lapels and a slit in said stiff layer extending from the apex of one notch to the apex of another notch thereby adapting said collar to temporarily fold along the line of said slit.

12. A coat comprising a body portion and a collar and lapel portion forming a continuation of said body portion, said portions being made up of two outside layers of cloth and an inter-lining, the collar being divided from the lapels by V-shaped notches and the inter-lining being provided with a slit from one notch to another.

13. A coat comprising a body portion and a collar and lapel portion forming a continuation of said body portion, said portions being made up of two outside layers of cloth and an inter-lining, the collar being divided from the lapels by notches and the interlining being provided with a slit from one notch to another.

14. A coat made of a plurality of layers of material and provided with a permanent crease forming a collar and lapel portion, said collar being divided from the lapels by notches, and one of said layers being provided with a slit extending from one notch to the other.

15. A coat made of a plurality of layers of material and provided with a permanent crease forming a collar and lapel portion, said collar being divided from the lapels by notches, and one of said layers being provided with a slit extending from one notch to the other, the edges of said slit being flexibly connected.

16. A collar comprising a stand and a leaf, said leaf having a line of demarcation along which said leaf is adapted to be folded back on itself for the purpose of transforming said collar from a normal collar into a military collar.

17. A collar, comprising a stand, and a leaf, separated from said stand by a break line, said leaf having a line of demarcation along which said leaf is adapted to fold back on itself for the purpose of transforming said collar from a normal collar into a military collar.

18. A collar, comprising a stand and a leaf, said leaf having an incision therein forming a line of demarcation along which said leaf is adapted to fold back on itself to transform said collar from a normal collar into a military collar.

19. In a coat, in combination, a collar comprising a stand and a leaf, said leaf having a line of demarcation along which said leaf is adapted to be folded for the purpose of transforming said collar from a normal collar to a military collar, and lapels adapted to be reversed to overlap and cover the throat by extending to said line of demarcation when the collar is in military form.

20. In a coat, the combination with a stand and leaf of a collar, of interior stiffening material having a permanent crease to determine a break line or line of fold between the stand and leaf when the collar is in normal form, said leaf having a line of demarcation along which the leaf is adapted to be folded to transform said collar from a normal collar into a military collar, and lapels capable of being reversed and secured in overlapping position with their upper edges extending to said line of demarcation, thereby covering the throat portion of the military collar.

21. In a coat, in combination, a collar comprising a stand and a leaf, said leaf having an incision therein to form a line of demarcation along which said leaf is adapted to be folded on itself to transform said collar from a normal collar into a military collar, lapels partially divided from said leaf by V-shaped notches having apexes at the ends of said line of demarcation, said lapels being arranged to be capable of being folded over each other and secured in overlapped position with the upper edges in line with or forming continuations of the line of demarcation to fully close the throat portion of the military collar.

22. A collar comprising a stand and a leaf provided with two folding lines, one of which is permanent and divides the leaf from the stand forming the normal leaf portion, and the other line being a temporary folding line defined by a slit in the normal leaf of the collar and extending around the collar.

In testimony whereof I have signed my name to this specification, in the presence of two subscribing witnesses, on this 13th day of May, A. D. 1909.

M. H. SCHILLER.

Witnesses:
CHARLES H. SEEM,
FRANCIS A. HOPKINS.

Copies of this patent may be obtained for five cents each, by addressing the "Commissioner of Patents, Washington, D. C."